United States Patent
Jeyakeerthi

(10) Patent No.: US 9,600,520 B2
(45) Date of Patent: Mar. 21, 2017

(54) METHOD AND SYSTEM FOR PROSPECTIVE SEARCH QUERY MANAGEMENT

(71) Applicant: Motorola Mobility LLC, Libertyville, IL (US)

(72) Inventor: Jeyappragash J Jeyakeerthi, Sunnyvale, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 390 days.

(21) Appl. No.: 14/274,803

(22) Filed: May 12, 2014

(65) Prior Publication Data

US 2015/0213084 A1    Jul. 30, 2015

Related U.S. Application Data

(60) Provisional application No. 61/931,307, filed on Jan. 24, 2014.

(51) Int. Cl.
*G06F 17/30* (2006.01)

(52) U.S. Cl.
CPC ............................. *G06F 17/30386* (2013.01)

(58) Field of Classification Search
None
See application file for complete search history.

(56) References Cited

U.S. PATENT DOCUMENTS

| | | | |
|---|---|---|---|
| 7,464,062 B2 | 12/2008 | Bodin et al. | |
| 2002/0183068 A1* | 12/2002 | Dunko | H04W 4/08 455/456.1 |
| 2009/0037395 A1 | 2/2009 | Ireland et al. | |
| 2013/0006965 A1* | 1/2013 | Barbas | G06F 17/3046 707/718 |

\* cited by examiner

*Primary Examiner* — Son T Hoang
(74) *Attorney, Agent, or Firm* — Remarck Law Group PLC

(57) ABSTRACT

A method for managing prospective search queries is provided. A first prospective search query is received. A first sample data set is determined based on a union of the first prospective search query and a second prospective search query. An indication that the first prospective search query is not mutually exclusive with the second prospective search query is provided if the first sample data set matches the second prospective search query.

17 Claims, 4 Drawing Sheets

METHOD AND SYSTEM FOR PROSPECTIVE SEARCH QUERY MANAGEMENT

CROSS-REFERENCE TO RELATED APPLICATION

The present application claims priority to U.S. Provisional Patent Application 61/931,307, filed Jan. 24, 2014, the contents of which are hereby incorporated by reference herein.

TECHNICAL FIELD

The present disclosure is related generally to prospective searching and, more particularly, to managing prospective search queries.

BACKGROUND

In a search application that uses retrospective search techniques, such as a Google search, the search application initially builds an index of data to be searched at a later time. The index may be updated as new data is provided. While the index allows for efficient searches when a search query is provided, the need to index the data before executing the search query increases the complexity and expense of some real-time applications. In order to obtain a real-time or near real-time result for several search queries, the search queries must be executed separately against a potentially large index with repetitions for each update to the index.

In contrast to retrospective search techniques, prospective search techniques entail the comparing of continuous input streams of data sets against a set of predefined queries, as a result of which each data set of the stream may be matched to one or more of the predefined queries. Based on the matching of a data set to one or more of the queries, certain predefined actions corresponding to the matched queries may then be triggered. Thus, a prospective search query is an anticipatory query that is defined prior to the arrival of data and may act as a "selector" for the subsequent stream of incoming data sets. The matching is performed on the arrival of a data set in the stream and an action associated with a query is performed if the data set matches that query. For example, if a query is defined such that (language="EN" AND region="US" AND device="MotoX") then a data set with values such as (serial_no=ABC1234; language="EN"; region="US"; device="MotoX"; carrier="ABC Wireless") will match the query. If an action is associated with the query then that action is performed on this data that matches the query. If there is another data set from the data stream with values such as (serial_no=ABC1235; language="CN"; region="US"; device="MotoX"; carrier="ABC Wireless"), this does not match the query and an action associated with that match is not performed on that data set.

If there is a second query that is defined such that (language="EN" and region="US" and carrier="ABC Wireless") then the same data stream with values (serial_no=ABC1234; language="EN"; region="US"; device="MotoX"; carrier="ABC Wireless") matches both the first query and the second query and thus the actions associated with both the queries may be performed. In some scenarios, it is desirable to reduce the occurrence of performing multiple actions for the same data set. For example, duplicate actions could result in redundant pieces of data being sent to a mobile device or the actions could be conflicting actions that interfere with mobile device operations. As another example, in a client-server architecture where a mobile device (e.g., a client) provides a data set to an update server (e.g., a server), several software updates or configuration settings for mobile devices may be maintained on the server while only certain updates or settings are needed by a given device. There is a possibility that the data set for a mobile device matches more than one predefined query, as a result of which a repetitive set of predefined actions (e.g., transmission of an over-the-air software update or updated device configuration settings to the mobile device) would be triggered.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
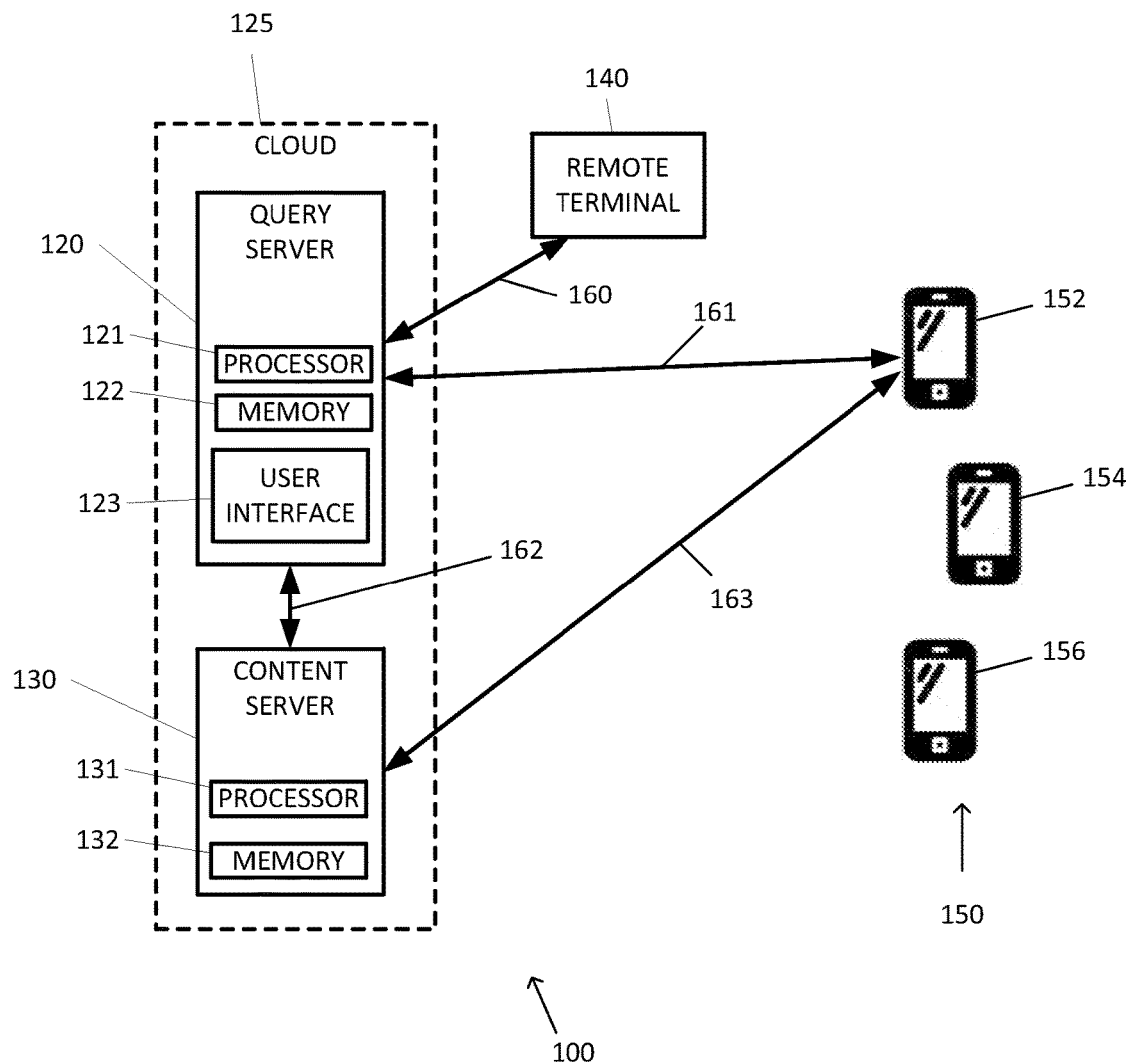
FIG. 1 is a block diagram illustrating a system for managing prospective queries, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present disclosure describes methods and devices for management of prospective search queries. Various embodiments provide a method and system for reducing non-mutually exclusive data queries during a prospective search process. When processing a stream of data sets with a stored set of prospective search queries, redundant effects or search hits may be reduced by providing an indication of those prospective search queries that are not mutually exclusive. Thus, at the time of definition of a query, it is determined whether there are "duplicates" of the query. Duplicate queries exist where for a given data set, there is more than one query that matches the data set, therefore performing multiple actions for that data set.

One embodiment includes a method for managing prospective search queries. A first prospective search query is received. A first sample data set is determined based on a union of the first prospective search query and a second prospective search query. An indication that the first prospective search query is not mutually exclusive with the second prospective search query is provided if the first sample data set matches the second prospective search query.

Another embodiment includes a method for managing prospective search queries. An input prospective search query is received. The input prospective search query is compared with one or more prospective search queries of a stored set of prospective search queries. An indication is provided if the input prospective search query is not mutually exclusive with the stored set based on the comparison. The input prospective search query is added to the stored set if the input prospective search query is mutually exclusive with the stored set.

Yet another embodiment includes a system for processing prospective search queries. The system includes a query server with a processor and memory. The query server stores a stored set of prospective search queries. Upon receipt of an input prospective search query, the query server compares the input prospective search query with one or more prospective search queries of the stored set. The query server provides an indication if the input prospective search query is not mutually exclusive with the stored set based on the comparison. The query server adds the input prospective search query to the stored set if the input prospective search query is mutually exclusive with the stored set. The query server processes a stream of data sets with the stored set of prospective search queries.

Turning to FIG. 1, a system 100 for managing prospective queries is shown, according to an embodiment. The system 100 includes an electronic device that performs, stores, or manages prospective search queries ("queries"), such as a query server 120. The query server 120 performs prospective search queries on (e.g., processes) one or more data sets, such as a stream of data sets. The query server 120 includes a processor 121 and a memory 122, as described herein. Examples of the query server 120 include an application server, web server, database server, or other network entity accessible either directly or indirectly via one or more intermediate devices or networks (e.g., via a WLAN access point, the Internet, LTE network, or other network). In other implementations, the query server 120 is implemented as a cloud server 125 or portion thereof that provides a cloud service.

The system 100 may further include a content server 130, a remote terminal 140, and a set of mobile devices 150. The content server 130 includes a processor 131 and a memory 132, as described herein. Examples of the content server 130 include an application server, web server, database server, or other network entity accessible either directly or indirectly via one or more intermediate devices or networks (e.g., via a WLAN access point, the Internet, LTE network, or other network). In other implementations, the content server 130 is implemented as a cloud server 125 or portion thereof that provides a cloud service. The content server 130 stores content updates for the set of mobile devices 150, such as software updates, firmware updates, configuration information, or other data. The content server 130 may send content updates to one or more of the set of mobile devices 150 upon an instruction from the query server 120. For example, if a data set from a mobile device matches a query, the query server 120 may trigger the content server 130 to send a content update to the mobile device.

Examples of the remote terminal 140 include a work station, computer, smartphone, or other electronic device capable of providing a user interface. In other implementations, the query server 120 may include a user interface 123. In the example shown in FIG. 1, the set of mobile devices 150 includes mobile devices 152, 154, and 156. In alternative embodiments, additional or fewer mobile devices may be present. Examples of the mobile devices 152, 154, and 156 include, but are not limited to, mobile devices, smart phones, smart watches, wireless devices, tablet computing devices, personal digital assistants, personal navigation devices, touch screen input device, touch or pen-based input devices, portable video and/or audio players, and the like. It is to be understood that the mobile device 100 may take the form of a variety of form factors, such as, but not limited to, bar, tablet, flip/clam, slider, rotator, and wearable form factors.

One or more of the query server 120, the content server 130, the remote terminal 140, or the set of mobile devices 150 are communicatively coupled, for example, by communication links 160, 161, 162, or 163. Examples of the communication links 160, 161, 162, or 163 include wired networks (e.g., local area networks, wide area networks, the Internet), wireless networks (e.g., IEEE 802.11, Bluetooth, infrared, cellular, or other radio frequency networks), or combinations thereof. The query server 120, the content server 130, the remote terminal 140, or the set of mobile devices 150 may communicate over the communication links 160, 161, 162, or 163 using standard interfaces, or proprietary interfaces. The query server 120, the content server 130, the remote terminal 140, or the set of mobile devices 150 may also be configured for secure or encrypted communications over one or more of the communication links 160, 161, 162, or 163.

The query server 120 may receive the queries from a user of the remote terminal 140, from a user of the mobile devices 152, 154, or 156, a service provider, network operator, or other sources (e.g., from a content server). The query server 120 may receive the stream of data sets from the set of mobile devices 150 or other network entities. The query server 120 may receive one or more data sets per mobile device at a same time or over a period of time.

Upon receipt of a data set, the query server 120 performs one or more of the queries (e.g., compares the query to a data set) and determines whether the data set matches the queries. If a query matches the data set, the query server 120 may provide or store an indication of the match, perform an action that corresponds to the matched query, or take some other action. Examples of actions for queries include sending messages or data to the mobile device, such as over-the-air updates, updates to settings of a mobile device, freeform notifications, or other data. For example, the query server 120 may receive a data set with configuration information for the mobile device 152 when the mobile device 152 registers with a mobile network (not shown). The configuration information may include an operating system version for the mobile device 152 and the queries may correspond to updates to the operating system. Accordingly, if one of the queries matches the operating system version, the query server 120 may provide or trigger a software update to the mobile device 152. Other examples of data sets, queries, and actions will be apparent to those skilled in the art.

Figure 2:
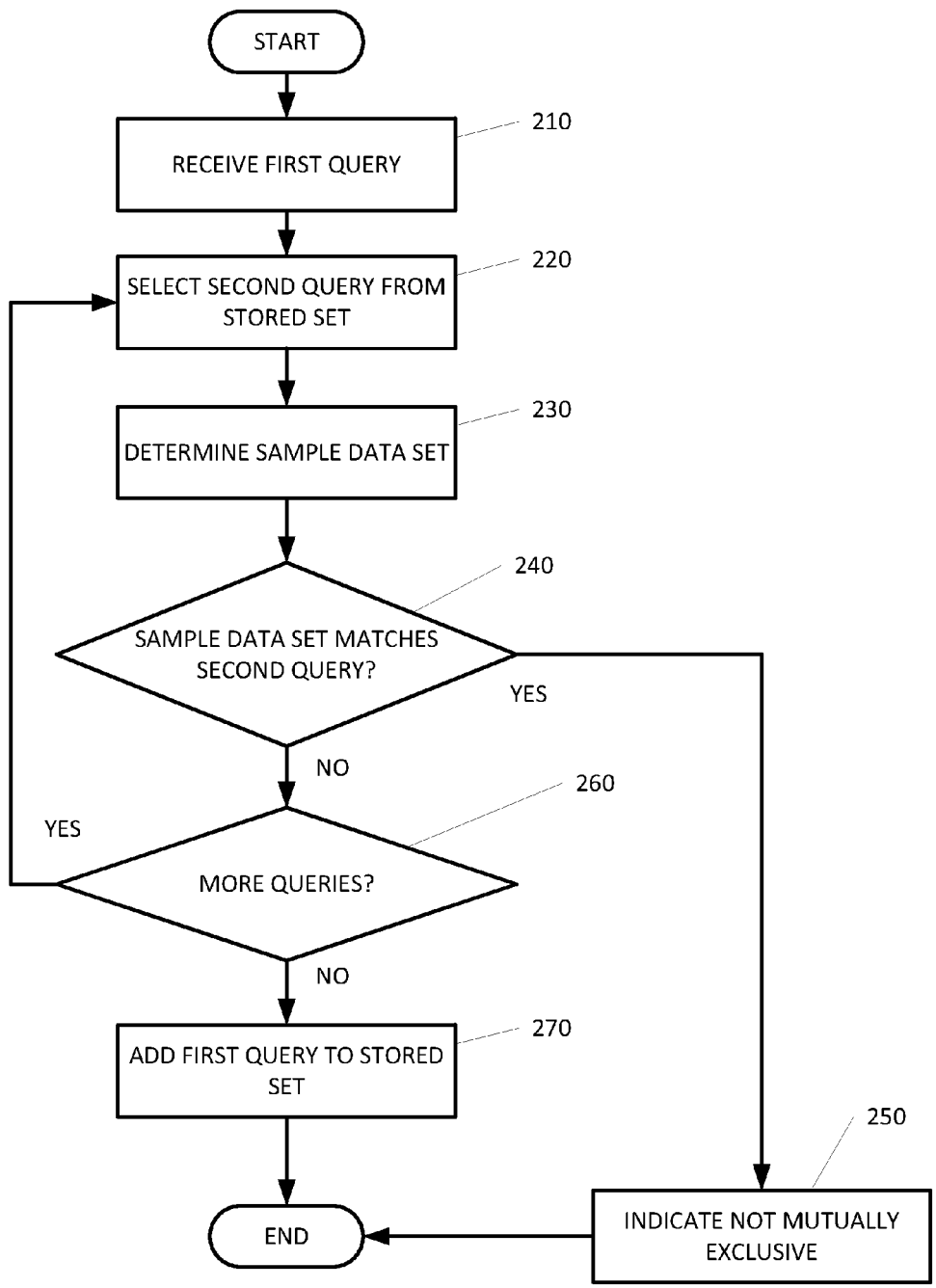
FIG. 2 is a flowchart of a method for managing prospective queries that may be performed by the system of FIG. 1, according to an embodiment.

Turning to FIG. 2, flowchart 200 illustrates one example of a process flow for managing prospective search queries that may be performed by the system 100 (e.g., by the query server 120). The query server 120 stores a stored set of prospective search queries for comparison to a data set. The stored set of queries may be queries that were previously entered by a user, loaded from a configuration file, or otherwise received by the query server 120. The query server 120 then receives (210) a first query (e.g., an input prospective search query), for example, from a user of the remote terminal 140. The first query includes one or more first keys with corresponding first values. The query server 120 selects (220) a second query (e.g., a selected prospective search query) from the stored set of queries. The second query includes one or more second keys with corresponding second values.

In order to determine whether the first query is mutually exclusive with the second query, the query server 120 determines (230) a sample data set (e.g., a partial data set) based on a union of the first query and the second query. The sample data set includes keys with corresponding values. The query server 120 determines the keys for the sample data set as a union of the first keys and the second keys such that the sample data set does not contain duplicate keys. The sample data set is thus a "superset" with a condition that, for any individual key, if the same key exists in both the first query and the second query, then the value from the first query is selected for the sample data set. Thus, the query server 120 determines a corresponding value for each key of the first sample data set as the corresponding second value for the key if the first prospective search query does not contain the key and as the corresponding first value for the key if the first prospective search query contains the key.

The query server 120 determines (240) whether the sample data set matches the second query. If the sample data set matches the second query and thus the first query is not mutually exclusive with the second query (YES at 240), the query server 120 provides (250) an indication that the first query is not mutually exclusive with the second query if the first sample data set matches the second query. To provide the indication, the query server 120 in one example stores the first query with a duplication flag that indicates that the first query is not mutually exclusive with the second query. In another example, the query server 120 sends a notification to the user that entered the first query. The notification indicates that the first query is not mutually exclusive with the second query.

If the sample data set does not match the second query (NO at 240), the query server 120 determines whether additional queries of the stored set of queries are available. If additional queries are available (YES at 260), the query server 120 returns to select (220) another query (e.g., a third query) from the stored set of queries, determine (230) another sample data set (e.g., a second sample data set), and determine (240) whether the second sample data set matches the third query. If no additional queries are available from the stored set of queries (NO at 260), the first query has been found to be mutually exclusive with each query of the stored set of queries. The query server 120 then adds (270) the first query to the stored set of queries. The query server 120 may then use the first query when processing the stream of data sets.

In some cases, a new query may be added to the stored set before the new query has been compared against each other query of the stored set. For example, if the stored set is large, it may be desirable to add the new query to the stored set while performing the comparisons in a background operation. In this case, the query server 120 may disable the new query upon a determination that the new query is not mutually exclusive with the stored set.

Figure 3:
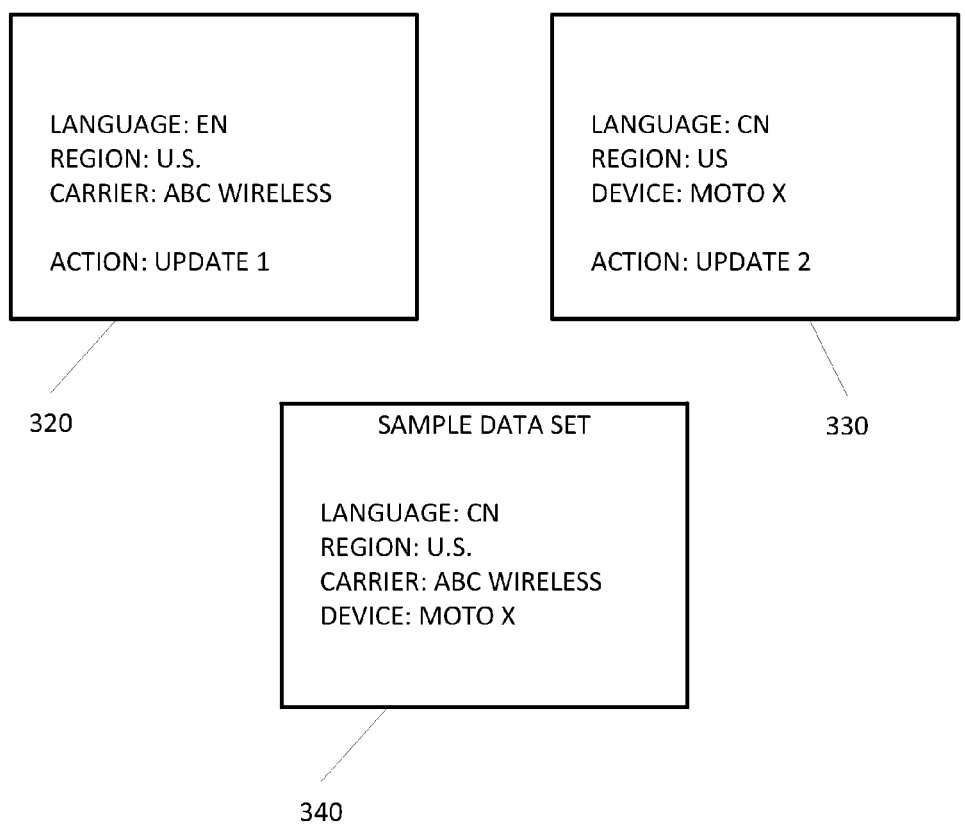
FIG. 3 is a diagram of prospective search queries that may be managed using the method of FIG. 2, according to an embodiment.

Turning to FIG. 3, the query server 120 stores a query 320 that corresponds to a first action "UPDATE 1." Query 320 includes keys for language, region, and carrier with values as (language="EN" AND region="US" AND carrier="ABC Wireless"). As one example, a user may try to create query 330 with keys for language, region, and device with values as (language="CN" AND region="US" AND device="MotoX") and corresponding to a second action "UPDATE 2."

The query server 120 unions the query 320 with the query 330 to create a sample data set 340 (e.g., a "superset") with the condition that, for any individual key, if the same key exists in query 320 and query 330 then the value from the query 330 is used in the sample data set 340. The query server 120 thus performs a union of the queries themselves, not of the results of the queries. So in the above case, the sample data set 340 has keys for language, region, carrier, and device with values as (language="CN" AND region="US" AND carrier="ABC Wireless" AND device="MotoX"). The query server 120 then tries to match the sample data set 340 with the query 320. In this case the data of the sample data set 340 (language="CN" AND region="US" AND carrier="ABC Wireless" AND device="MotoX") does not match query 320 and therefore query 330 is a non-duplicating query (i.e., mutually exclusive).

Figure 4:
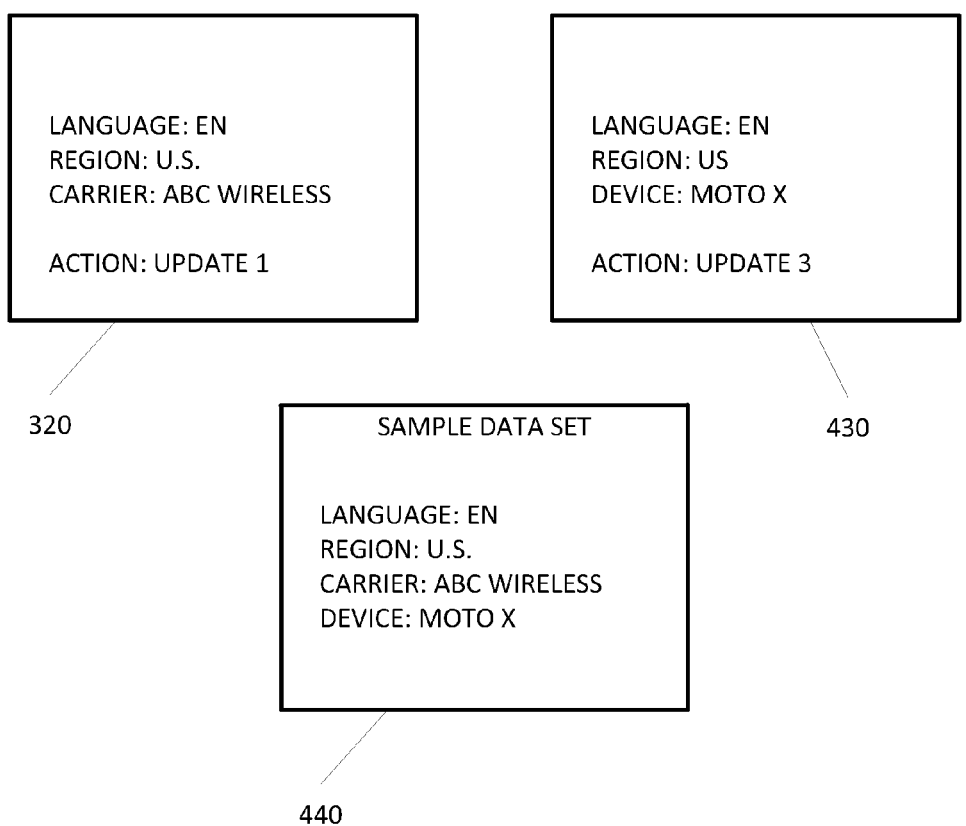
FIG. 4 is another diagram of prospective search queries that may be managed using the method of FIG. 2, according to an embodiment.

Turning to FIG. 4, the query server 120 in one example stores the query 320 that corresponds to the first action "UPDATE 1." The user may enter a query 430 that includes keys for language, region, and device with values as (language="EN" AND region="US" AND device="MotoX") that corresponds to a third action "UPDATE 3." The query server 120 determines a sample data set 440 with keys for language, region, carrier, and device with values as (language="EN" AND region="US" AND carrier="ABC Wireless" AND device="MotoX"). However, the sample data set 440 matches the query 320, which indicates that query 430 "duplicates" or is not mutually exclusive with query 320. The query server 120 thus provides the indication that the query 430 is not mutually exclusive.

As the query server 120 receives new queries (e.g., created by the user via the remote terminal 140), the query server 120 checks the new query against the stored set of queries before the new query is added to the stored set of queries to reduce the occurrence for duplicate actions. While the above-mentioned examples use AND operators to join the keys of the queries, other Boolean, algebraic, or mathematical operators may be used, such as OR, greater than, less than, greater than or equal to, and other operators as will be apparent to those skilled in the art.

It can be seen from the foregoing that a method and system for management of prospective search queries have been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

I claim:

1. A method for managing prospective search queries, the method comprising:
    receiving a first prospective search query, wherein the first prospective search query comprises one or more first keys with corresponding first values;
    determining a first sample data set based on a union of the first prospective search query and a second prospective search query, wherein the second prospective search query comprises one or more second keys with corresponding second values; and
    providing an indication that the first prospective search query is not mutually exclusive with the second prospective search query if the first sample data set matches the second prospective search query, wherein the determining the first sample data set comprises:
        determining keys of the first sample data set as a union of the one or more first keys with the one or more second keys, wherein the union does not contain duplicate keys, and
        determining a corresponding value for each key of the first sample data set as the corresponding second value for the key if the first prospective search query does not contain the key and as the corresponding first value for the key if the first prospective search query contains the key.

2. The method of claim 1, further comprising determining whether the first sample data set matches the second prospective search query.

3. The method of claim 1, wherein the providing the indication comprises storing the first prospective search query with a duplication flag that indicates that the first prospective search query is not mutually exclusive.

4. The method of claim 1, wherein the receiving the first prospective search query comprises receiving the first prospective search query from a user;
    wherein the providing the indication comprises sending a notification to the user that indicates that the first prospective search query is not mutually exclusive.

5. The method of claim 1, further comprising processing a stream of data sets with the first and second prospective search queries.

6. The method of claim 5, further comprising disabling the first prospective search query if the first prospective search query is not mutually exclusive.

7. The method of claim 1, further comprising:
    determining a second sample data set based on a union of the first prospective search query and a third prospective search query; and
    providing an indication that the first prospective search query is not mutually exclusive with the third prospective search query if the second sample data set matches the third prospective search query.

8. The method of claim 1, further comprising:
    selecting the second prospective search query from a set of stored prospective search queries; and
    adding the first prospective search query to the set of stored prospective search queries if the first sample data set does not match the second prospective search query.

9. The method of claim 8, further comprising:
    selecting a third prospective search query from the set of stored prospective search queries;

determining a second sample data set based on a union of the first prospective search query and the third prospective search query; and providing an indication that the first prospective search query is not mutually exclusive with the third prospective search query if the second sample data set matches the third prospective search query; wherein the adding the first prospective search query comprises adding the first prospective search query to the set of stored prospective search queries only if the first sample data set does not match the second prospective search query and the second sample data set does not match the third prospective search query.

10. A method for managing prospective search queries, the method comprising:

receiving an input prospective search query, wherein the input prospective search query comprises an input set of keys with corresponding input values;

comparing the input prospective search query with one or more prospective search queries of a stored set of prospective search queries, wherein the comparing the input prospective search query with the one or more prospective search queries comprises:

selecting a prospective search query from the stored set, wherein the selected prospective search query comprises a selected set of keys with corresponding selected values, determining a sample data set based on a union of the input set of keys and the selected set of keys, wherein the union does not contain duplicate keys, determining a corresponding value for each key of the sample data set as the corresponding selected value for the key if the input prospective search query does not contain the key and as the corresponding input value for the key if the input prospective search query contains the key, and determining that the input prospective search query is not mutually exclusive with the selected prospective search query if the sample data set matches the selected prospective search query;

providing an indication if the input prospective search query is not mutually exclusive with the stored set based on the comparison; and adding the input prospective search query to the stored set if the input prospective search query is mutually exclusive with the stored set.

11. The method of claim 10, wherein the providing the indication comprises storing the input prospective search query with a duplication flag that indicates that the input prospective search query is not mutually exclusive.

12. The method of claim 10, wherein the receiving the input prospective search query comprises receiving the input prospective search query from a user; wherein the providing the indication comprises sending a notification to the user that indicates that the input prospective search query is not mutually exclusive.

13. The method of claim 10, further comprising:

processing a stream of data sets with the input prospective search query and the stored set of prospective search queries; and disabling the input prospective search query if the input prospective search query is not mutually exclusive with the stored set.

14. A system for managing prospective search queries, the system comprising:

a query server that comprises a processor and a memory; wherein the query server stores a stored set of the prospective search queries;

upon receipt of an input prospective search query, the query server compares the input prospective search query with one or more prospective search queries of the stored set;

the query server provides an indication if the input prospective search query is not mutually exclusive with the stored set based on the comparison;

the query server adds the input prospective search query to the stored set if the input prospective search query is mutually exclusive with the stored set;

the query server processes a stream of data sets with the stored set of prospective search queries;

the input prospective search query comprises an input set of keys with corresponding input values;

the query server:

selects a prospective search query from the stored set, wherein the selected prospective search query comprises a selected set of keys with corresponding selected values;

determines a sample data set based on a union of the input set of keys and the selected set of keys, wherein the union does not contain duplicate keys;

determines a corresponding value for each key of the sample data set as the corresponding selected value for the key if the input prospective search query does not contain the key and as the corresponding input value for the key if the input prospective search query contains the key;

determines that the input prospective search query is not mutually exclusive with the selected prospective search query if the sample data set matches the selected prospective search query;

determines that the input prospective search query is mutually exclusive with the stored set if the input prospective search query is mutually exclusive with each prospective search query of the stored set.

15. The system of claim 14, wherein the query server stores the input prospective search query with a duplication flag if the input prospective search query is not mutually exclusive with the stored set.

16. The system of claim 14, wherein the query server sends a notification to a user that indicates that the input prospective search query is not mutually exclusive with the stored set.

17. The system of claim 14, wherein the query server processes a stream of data sets with the input prospective search query and the stored set of prospective search queries and disables the input prospective search query if the input prospective search query is not mutually exclusive with the stored set.

* * * * *